Figure 1:
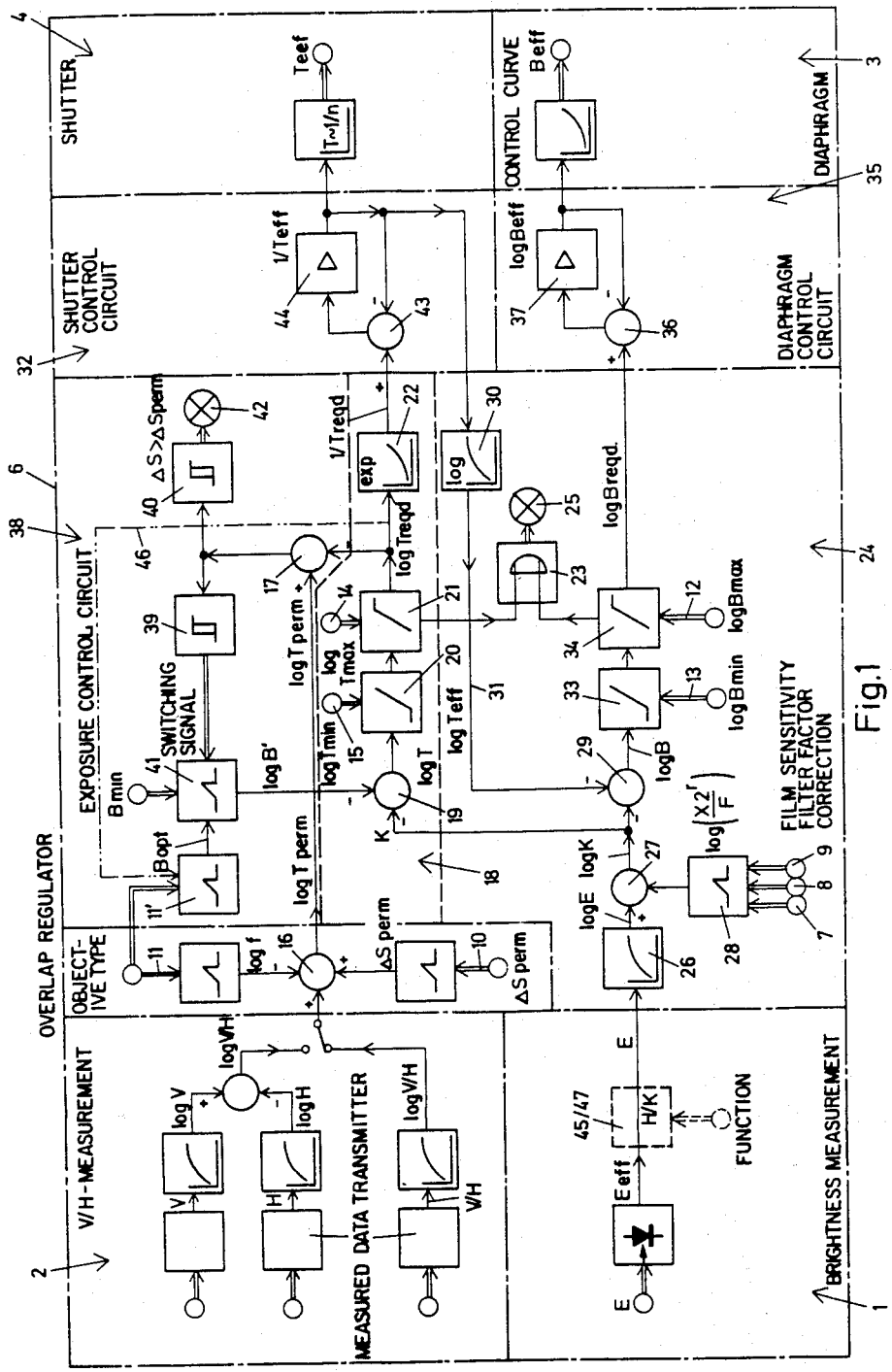

United States Patent [19]

Kucher

[11] Patent Number: 4,490,028
[45] Date of Patent: Dec. 25, 1984

[54] EXPOSURE-CONTROL DEVICE ON AN AERIAL CAMERA

[75] Inventor: Gerhard Kucher, Lustenau, Austria

[73] Assignee: Wild Heerbrugg Aktiengesellschaft, Heerbrugg, Switzerland

[21] Appl. No.: 457,075

[22] PCT Filed: May 6, 1982

[86] PCT No.: PCT/CH82/00066
§ 371 Date: Jan. 5, 1983
§ 102(e) Date: Jan. 5, 1983

[87] PCT Pub. No.: WO82/04131
PCT Pub. Date: Nov. 25, 1982

[30] Foreign Application Priority Data

May 11, 1981 [CH] Switzerland .................. 3028/81

[51] Int. Cl.³ ............................................. G03B 39/00
[52] U.S. Cl. .................................................... 354/66
[58] Field of Search ............................. 354/65, 66, 67

[56] References Cited

U.S. PATENT DOCUMENTS

| | | | |
|---|---|---|---|
| 3,163,098 | 12/1964 | Kierstead, Jr. .................... | 354/66 |
| 3,324,777 | 6/1967 | Kanner ............................. | 354/65 |
| 3,469,515 | 9/1969 | Hillman ........................... | 354/66 |
| 3,608,453 | 9/1971 | Dirksen et al. ................... | 354/66 |
| 3,997,795 | 12/1976 | Pohl et al. ........................ | 354/66 |

FOREIGN PATENT DOCUMENTS 2403862 8/1975 Fed. Rep. of Germany .
2403863 8/1975 Fed. Rep. of Germany .
2715265 10/1977 Fed. Rep. of Germany .

Primary Examiner—Russell E. Adams
Attorney, Agent, or Firm—Roylance, Abrams, Berdo & Goodman

[57] ABSTRACT

A system for controlling a diaphragm aperture and shutter speed of an aerial camera involves computing maximum permissible exposure time as a function of permissible image motion, and flying speed and height. The shutter time is adjusted within a normal working range as a function of exposure conditions for a particular diaphragm value after evaluating the maximum permissible exposure time, mean brightness, status signals of the diaphragm and shutter control mechanism and process signals. The diaphragm is adjusted to a minimum diameter diaphragm aperture according to brightness conditions encountered at the minimum shutter time limit of the normal working range and to a maximum diameter diaphragm aperture at the maximum permissible exposure time. The aperture values are successively decreased and for each discrete aperture value the shutter time is adjusted as a function of terrain brightness within the normal working range. At the maximum diameter diaphragm aperture, the shutter time is adjusted within the range between the maximum permissible exposure time and a maximum value.

19 Claims, 4 Drawing Figures

EXPOSURE-CONTROL DEVICE ON AN AERIAL CAMERA

The invention relates to an exposure-control device on an aerial camera with an arrangement at whose input ends there are signals of the measured values for the flying speed v and the flying height h or the quotient v/h and for the permissible image motion $\Delta s_{perm}$ for determining the maximum permissible exposure time $T_{perm}$ in accordance with the formula $$T_{perm} = \frac{\Delta s_{perm}}{\frac{v}{h} \cdot f}$$

and for the exposure interval (cycling time), with an exposure meter for the continuous integral metering of the brightness of the terrain being overflown, with devices to control diaphragm and shutter.

In a device which has become known, a signal is emitted by an exposure meter directed upon the terrain to be photographed, which sets the shortest possible shutter time and the aperture to the corresponding value. As the brightness decreases the diaphragm is opened wider in accordance with the light conditions encountered, up to its maximum aperture. If the light decreases even further, the shutter time is also altered to longer time values (Manual of colour aerial photography 1968, p144).

In another device which has become known, for the automatic control of exposure, the terrain to be photographed is scanned by an exposure meter and the corresponding signals are fed to an operational amplifier which generates an output signal which is used to control the exposure of the photograph.

In this, an exposure-control device is connected with a v/h sensor, whose signals directly influence the exposure control accordingly and which in addition also control the exposure sequence (Manual of Photogrammetry 1966, 3rd edition, p172). In yet another exposure-control device v/h value is also used, together with other photographic values, such as filter factor, permissible image motion, etc. in order to obtain and set the maximum permissible exposure time dependent on the v/h value. In a second computer the corresponding aperture is computed and set for this time setting, in accordance with the brightness conditions measured with an exposure meter. In addition, a further control device can react upon the arrangement to control exposure time in the limiting ranges of the (maximum and minimum) aperture settings (DE-PS No. 24 03 862).

In these instruments the disadvantage resides in the fact that the exposure-control device is essentially based on a time value which is either preset and fixed or which depends on v/h and in which the diaphragm is adjusted according to the lighting conditions encountered.

Thus, the lens aperture with the optimum imaging performance is not generally available for the exposure.

However, it is desirable to utilize the optimum imaging quality of the lens system used, and this lies within the optimum aperture range.

It is one of the objects of the present invention to create an exposure-control device for an aerial camera which avoids these disadvantages and which regulates aperture and exposure time by optimizing criteria which take into account the substantially continuously measured brightness of the terrain being overflown and to be photographed, the lens aperture producing the substantially optimum imaging performance, the dynamic control characteristics of the devices controlling diaphragm and shutter, and the permissible or tolerable image motion, in order always to work within the optimum exposure range even when the terrain conditions are variable both as regards the terrain itself and also with regard to the lighting conditions encountered. Despite this, the exposure-control device should be of simple construction and provide the operator with the possibility of manual intervention for correction or permit automatic correction when the brightness conditions occur that would falsify the picture content. Moreover, it is desirable for the exposure-control device to have a self-monitoring device, in order to enable the operator to recognize and possibly correct any functional defects during the survey flight itself.

The objective can be achieved if, in accordance with the present invention, an exposure-control circuit device is switched to the output ends of the arrangement and of the exposure meter to determine the maximum permissible exposure time and the exposure interval (cycling time), and if this is connected to the device controlling diaphragm and shutter in such a way that, after taking into account the signals for $T_{perm}$ and the mean brightness, the status signals of the circuits controlling diaphragm and shutter and of the process signals at an aperture value B, the shutter time T is adjustable in accordance with the exposure conditions within the interval $[T_{min}, T_{perm}]$ representing the normal working range, whereby on reaching the limits of the normal working range give by $T_{min}$ the aperture can be adjusted within the range $[B, B_{max}]$ (where $B_{max}$=minimum diameter of diaphragm aperture) in accordance with the brightness conditions encountered and whereby on reaching the limit defined by $T_{perm}$ a diaphragm adjustment can be carried out within the range $[B, B_{min}]$ (where $B_{min}$=maximum diameter of diaphragm aperture), whereby the diaphragm adjustment of the diaphragm value B is carried out successively by discrete values $B' < B$ and for each of these discrete values the shutter time is controlled in dependence of the brightness of the terrain within the range $[T_{min}, T_{perm}]$ and where the shutter time is adjustable within the range $[T_{min}, T_{max}]$ when the minimum aperture value $B_{min}$ is reached.

For preference, the value $B_{opt}$ is selected for the aperture value B.

In addition, it is possible to provide a feedback-signal line from the shutter-control device to the exposure-control circuit device for the effective shutter time $T_{eff}$, wherein the exposure-control circuit device compares the value of $\Delta s_{eff}$ pertaining to $T_{eff}$ with that of $\Delta s_{perm}$ and which emits a signal when $\Delta s_{eff}$ is greater than $\Delta s_{perm}$, which signal is transmitted to a fault-signalling device.

Further, the exposure-control circuit device can also have a holding link for storing signals during a time interval which in the event of mean brightness values occurring which would falsify the exposure data emits the signals of the previous diaphragm/time combination to the device controlling the diaphragm and/or shutter.

It is also useful if the exposure-control circuit device has a correction circuit in which the momentarily measured exposure data can be corrected by the manual input of values and in which this correction circuit for emitting the signals corresponding with the corrected values for aperture and shutter time is connected to the control device for aperture and shutter.

Further, the exposure-control circuit device can also have a holding link for storing signals and a correction circuit, whereby the signals of the momentary values for aperture and shutter time are combined after being checked and weighted with the stored signals and these combination signals are connected to the control device for aperture and shutter.

An automatic self-monitoring circuit for the exposure-control circuit device is also of advantage which in the event of a fault occurring will emit a signal to the fault-signalling device.

Further details and characteristics are provided in the descriptions of examples executed in accordance with the above, by reference to the drawings attached hereto. In this, FIG. 1 shows a circuit diagram of the exposure-control device (including two alternative versions)

Figure 2:
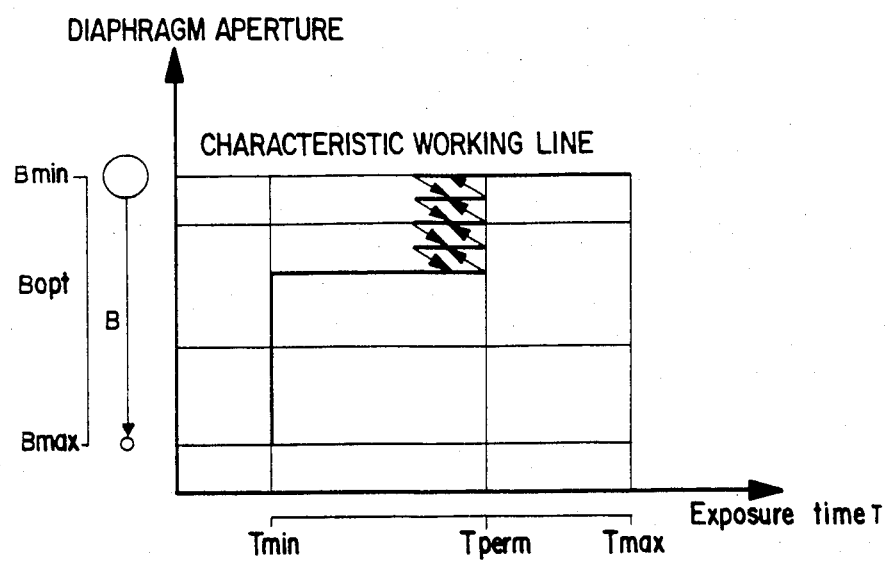

FIG. 2 shows the characteristic working line of the exposure-control device in accordance with FIG. 1

Figure 3:
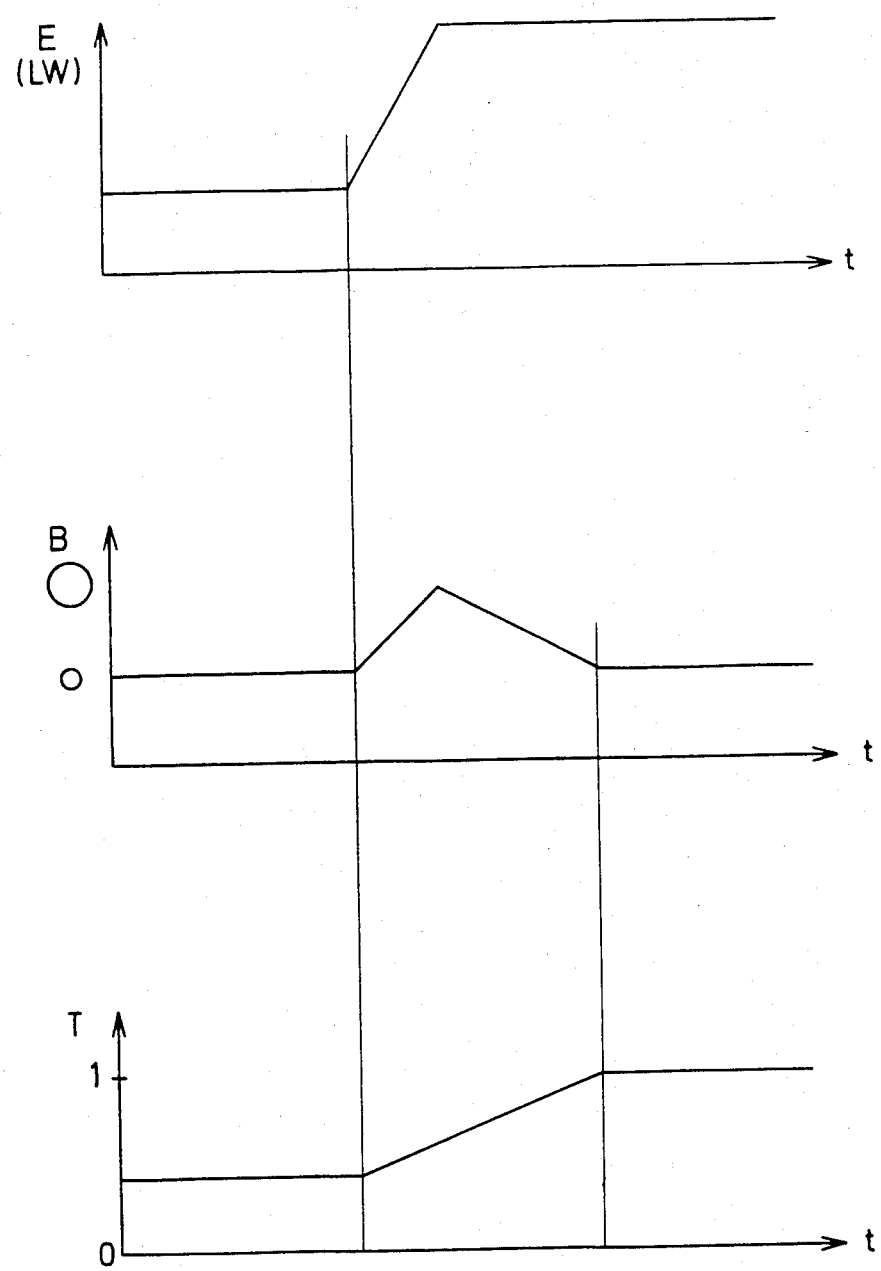
Figure 4:
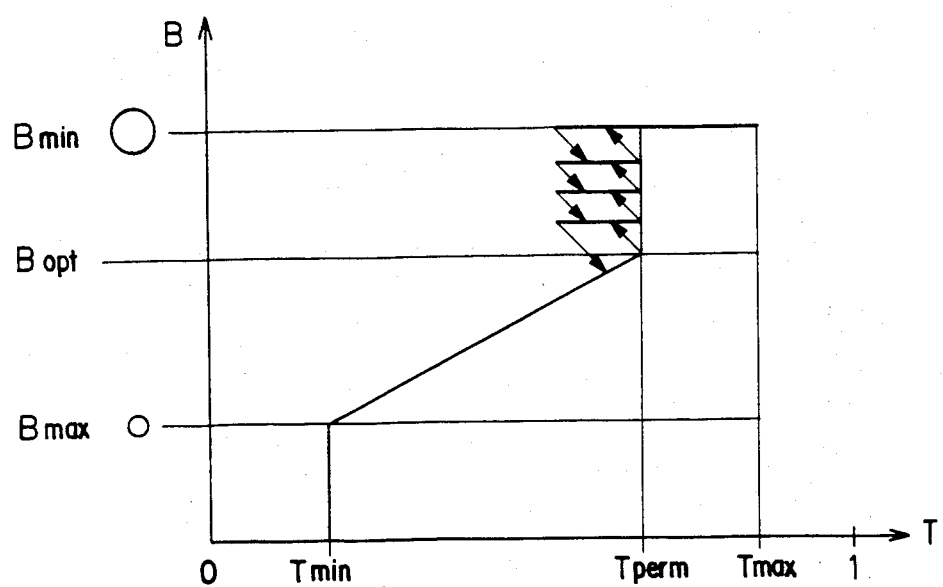

FIG. 3 shows a representation of the short-term, locally limited characteristic lines of aperture control and shutter control resulting from the dynamic behaviour of the devices controlling aperture and shutter when a change occurs in the light conditions encountered FIG. 4 shows the characteristic working line of the version of the exposure-control device in accordance with FIG. 1 but having a feedback line (— —..— —..— —)

The exposure-control device has, on the one hand, an exposure meter 1 and a device 2 to emit a v/h signal which obtains the v/h signal from the separate values for v (flying speed) and h (flying height) or by means of a v/h sensor and, on the other, a device each for controlling aperture 3 and shutter 4, the two sensor circuits and the two control circuits being connected to the output and input ends respectively of an exposure-control circuit device. In addition, this exposure-control circuit device also has input terminals for entering the values for film speed ×7, a filter factor F 8, a correction factor r 9, the permissible image motion $\Delta s_{perm}$ 10 and the focal length 11 of the objective lens which is entered automatically when the objective lens is attached, together with an overlap regulator. Further, input terminals are also provided for the values for maximum and minimum diaphragm aperture 12, 13 which can also be scanned from the objective lens after it has been inserted and for setting maximum and minimum shutter times 14, 15 and which depend on the built-in shutter device 4.

The exposure-control circuit (forming part of the exposure-control circuit device) functions arithmetically, for example as shown in FIG. 1, the signals of the effective values being converted into corresponding logarithmic signals, the known relationships beteen input values and exposure time T and of the diaphragm aperture B being used in order to determine and control these. For example, one version of the exposure-control circuit 6 has a first registering amplifier 16 for f 10 and (v/h) 11 at the input terminals for $\Delta s_{perm}$ which generates the signal for log $$T_{perm} = \log \frac{\Delta s_{perm}}{\frac{v}{h} \cdot f}$$

in dependence of the v/h signals, which varies according to v/h and represents a comparative value for the exposure time which is to be set in dependence of the brightness values measured by the exposure meter 1. This signal log $T_{perm}$ is conducted to a second registering amplifier 17 together with a signal log $T_{reqd}$.

This signal log $T_{reqd}$ is the intermediate output signal of a limiting circuit 18 which has a third registering amplifier 19 with a first lower voltage-limiter link 20 and a first upper voltage-limiter link 21 in series and an exponential amplifier 22 placed next to this, the latter emitting a signal $1/(T_{reqd})$ at its output terminal. The first lower voltage-limiter link 20 has an input terminal 15 for the minimum shutter time $T_{min}$ and the first upper voltage-limiter link 21 has an input terminal 14 for the maximum shutter time $T_{max}$ and an output terminal on which an OR link 23 of a first sub-circuit 24 of the exposure-control circuit 6 is placed. On this OR link there is a range-limit display 26 which enters into operation whenever any of the lower or upper control-range limiting values are reached, i.e. $T_{min}$, $B_{max}$, $T_{max}$, $B_{min}$.

The exposure meter 1 is placed at the input end of this sub-circuit and emits a signal $E_{eff}$ to a first logarithmic amplifier 26. A fourth registering amplifier 27 connected to this receives the signal $(x \cdot 2^r)/F$ from the input switch 28, where x is the film speed, r is a correction factor and F is a filter factor, and emits its signal log K=log $$\left( E \cdot \frac{x \cdot 2^r}{F} \right),$$

on the one hand to the third registering amplifier 19 of the limiting circuit and, on the other, to a fifth registering amplifier 29 which is placed in and connected with the feedback line 31 for $T_{eff}$ and receives the feedback signal $T_{eff}$. Its output terminal is placed on a second lower voltage-limiting link 33 which has an additional input terminal for the minimum aperture value $B_{min}$ (=maximum diaphragm aperture diameter 13) and this is placed on a second upper voltage-limiting link 34 which has an input terminal for the maximum aperture value $B_{max}$ (=minimum diaphragm aperture diameter) and an output terminal placed on an OR link 23 and an output terminal placed on an aperture-control circuit 35 for log $B_{reqd}$.

The aperture-control circuit 35 has a sixth registering amplifier 36 which receives the signal $B_{reqd}$ which also receives the feedback signal $B_{eff}$ and which in turn emits a signal to a first power amplifier 37 on which the aperture-control device 3 is placed.

The intermediate output signal log $T_{reqd}$ is placed on the input terminal of the second registering amplifier 17 on whose other input terminal the signal log $T_{perm}$ of the first registering amplifier 16 is placed. The output is placed on a second sub-circuit 38 of the exposure-control circuit 6 between a first hysteresis link 39 and a second hysteresis link 40 each of which effects a switch-over to an adjacent aperture value within the range $[B_{opt}, B_{min}]$. The first hysteresis link 39 emits a switching signal to an input switch 41 which also receives a signal from a further input switch 11' corresponding to the optimum aperture value $B_{opt}$ of the objective lens in use which is obtained automatically from the objective lens in use together with the input of the focal length of the objective lens in use and emits a signal log B' to the third registering amplifier 19 of the limiting circuit 18. The second hysteresis link 40 is connected with a fault-signalling device 42 whih indicates when $\Delta s > \Delta s_{perm}$.

The output signal $1/(T_{reqd})$ of the exponential amplifier 22 is placed on a seventh registering amplifier 43 of the shutter-control circuit 32, whereby this registering amplifier receives a feedback signal $1/(T_{eff})$ and is placed with its output terminal on a second power amplifier 44 which emits an output signal to the shutter-control device 4.

Under normal conditions, when the brightness is adequate, a time/aperture combination is obtained for the correct or required exposure of the film for which an exposure time T of less than $T_{perm}$ is possible when the optimum aperture $B_{opt}$ is kept constant, i.e. the aperture at which the objective lens produces its best imaging performance. In this limited range $[T_{min}, T_{perm}]$, the normal working range, $\Delta s_{eff}$ is always $< \Delta s_{perm}$ and the optimum aperture is kept constant in this whilst the exposure time is always determined and then adjusted in accordance with the variable brightness of the object. If the adjusted time reaches the value $T_{min}$, i.e. the minimum time which can be set on the shutter, then, in order to obtain the correct or required exposure of the film, this shutter time $T_{min}$ is kept constant and the diaphragm is adjusted in accordance with the brightness of the object. If lighting conditions are inadequate and the shutter time adopts the value $T_{perm}$ which varies with v/h, a signal is emitted to a fault-signalling device 42. This fault-signalling device may be a warning lamp. On the other hand, in order nevertheless to obtain the correct or required exposure of the film, the diaphragm is adjusted by a discrete amount, which need not necessarily be a full stop, to a lower aperture value $B_1$ (i.e. with a larger aperture diameter than $B_{opt}$) and for this aperture value $B_1 < B_{opt}$ the shutter time T is then again adjusted in accordance with the brightness measured by means of the exposure meter, within the range $[T_{min}, T_{perm}]$. Preferably, however, when the brightness is adequate, the aperture is returned from the discrete value $B_1$ to the setting $B_{opt}$ by maintaining an amount of hysteresis which can be predetermined. If the brightness is further reduced, when $T_{perm}$ is also reached for this aperture value $B_1$, another signal is again emitted to the fault-signalling device 42 and the aperture is set by a further discrete value to the aperture value $B_2 < B_1 < B_{opt}$ and the shutter time is again controlled as in $B_1$ or by an hysteresis, by an interval $[T_{min}, T_{perm}]$ or part thereof, and so forth until the aperture value $B_{min}$ (maximum aperture diameter of diaphragm) is reached. In this, $\Delta s_{eff}$ is always $< \Delta s_{perm}$. Moreover, with this it is always possible to photograph with relatively short shutter times, an advantage on account of aircraft vibration.

Thus, the time $T_{perm}$ is used merely to reset to a different aperture which is again kept constant and to warn the operator.

These sections of the characteristic line or working ranges are obtained in a suitable arrangement of the circuitry elements as a result of a series of optimization criteria according to their weighting. So, for example, the characteristic working line shown in FIG. 2 is obtained as a result of such a series of optimization criteria, namely: the possible total setting range available for the diaphragm, dynamic characteristics of the diaphragm-control device (particularly the setting time necessary for any required alteration of the aperture value), the permissible image motion in the photograph or the corresponding limiting value for the shutter time $T_{perm}$, the vicinity of the aperture value producing optimum imaging performance or optimum aperture interval, useful life of the shutter device relative to various shutter times chosen. Weighting has been carried out in the sequence stated above. The term 'optimum aperture' also refers to an aperture value approximating to the theoretical optimum aperture value.

In consequence of the two conditions which take into account the dynamic characteristics, short-term changes occur in the characteristic line, since, for example, in the event of a change in the exposure time due to a change in object brightness, the aperture is adjusted first to the new brightness conditions on account of its more rapid adjustment capability, i.e. the shorter reaction time of the diaphragm-adjustment device, followed by the resetting of the shutter time which is adjusted later whilst the aperture is reset again to the earlier optimum value (shown diagrammatically in FIG. 3).

The permissible exposure time $T_{perm}$ computed from v/h is used as a limiting-value indicator which releases a warning signal or a series of correction signals for the discrete adjustment of the diaphragm to its minimum value (maximum aperture), without itself being used for exposure control within the normal working range $[T_{perm}, T_{min}]$.

In another version of the exposure-control device shown in FIG. 1 (shown by a dashed line in FIG. 1), there is a holding link 45 provided in the exposure meter 1 in front of the exposure-control circuit device which stores the signal from the exposure meter for a suitable predetermined period (which can be set) or in dependence of other signals and which then emits this to the exposure-control circuit device 5 for further processing.

A further version of an exposure-control device (shown in FIG. 1 by — —..— —) has a feedback 46 from the output terminal of the first upper voltage-limiting link 21 to the input terminal 11' for the focal length of the objective lens and the optimum aperture $B_{opt}$ (for the type of objective in use).

By means of a feedback-signal line, it is possible to produce a sloped section in the characteristic line between $T_{min}$ and $T_{perm}$, i.e. in the characteristic line of the normal working range of the exposure-control device, relative to the coordinate axis for the exposure time T. Such a version will be of advantage whenever there is a fairly extensive area near the optimum aperture of an objective lens which will give satisfactory results and where the rotary shutter is to be subjected to minimum wear, i.e. where it is to run at fairly low revolutions. In this version, a different weighting has been used in the optimization conditions from that in the earlier examples described above.

Within the purview of a further version of the exposure-control device it is possible to provide a correction circuit 47 in place of the holding circuit 45 shown dashed in FIG. 1, which corrects the measured exposure data either by values entered manually or combines them with the stored signals after checking and weighting the measured data in accordance with previously determined (adjustable) practice-related criteria and emits these corrected or combined signals to the device controlling the aperture-control device and/or the shutter-control device 3,4.

In a further advantageous version, an automatic monitoring circuit can be provided for the exposure-control device which, in the event of a fault in any circuit, emits a signal to the fault-signalling device 42. This can be carried out in such a manner that the type of display used will indicate (e.g. by means of a code etc) the type of fault to be identified. Certain faults can thereby possibly be eliminated during the survey flight, thus saving considerable expenditure of time and money.

The present invention includes the possibility of effecting these functions of the exposure-control device and of the form of its characteristic line also with the aid of microcomputers and such-like components and modules.

I claim:

1. An exposure control device for an aerial camera, comprising:

input means for receiving measured values of aircraft flying speed and height and of permissible image motion;

first means, coupled to said input means, for computing maximum permissible exposure time according to the relationship $$T_{perm} = \frac{\Delta s_{perm}}{\frac{v}{h} \cdot f}$$

wherein $T_{perm}$ = said maximum permissible exposure time,
$\Delta s_{perm}$ = said permissible image motion,
v = said flying speed, and
h = said flying height;

second means for determining an exposure interval;

an exposure meter for continuous integral metering of terrain brightness;

diaphragm and shutter control means for controlling the size of a diaphram aperture and for controlling shutter speed of a shutter; and exposure control means, coupled to outputs of said first and second means and said exposure meter and coupled to said diaphragm and shutter control means, for adjusting shutter time T within a range ($T_{min}$, $T_{perm}$) representing a normal working range as a function of exposure conditions for a diaphragm value B after evaluating signals for $T_{perm}$, mean brightness, status signals of said diaphragm and shutter control means and process signals, said exposure control means including a fault signalling device, said exposure control means adjusting the diaphragm within the range (B, $B_{max}$), where $B_{max}$ equals a minimum diameter diaphragm aperture according to brightness conditions encountered at limits of the normal working range reached at $T_{min}$, and adjusting the diaphragm within the range (B, $B_{min}$), where $B_{min}$ equals a maximum diameter diaphragm aperture, upon reaching limits defined by $T_{perm}$, said exposure control means successively adjusting the aperture value B to discrete values B' < B, and for each of the discrete values B' adjusting the shutter time as a function of terrain brightness within the range ($T_{min}$, $T_{perm}$), said exposure control means adjusting the shutter time within the range ($T_{perm}$, $T_{max}$) at $B_{min}$.

2. An exposure control device according to claim 1 wherein said exposure control means adjusts the aperture value B to an optimum diaphragm value $B_{opt}$.

3. An exposure control device according to claim 1 wherein said shutter control means comprises a feedback signal line for effective shutter time $T_{eff}$ such that said exposure control means compares a $\Delta s_{eff}$ value corresponding to $T_{eff}$ with $\Delta s_{perm}$ and emits a signal transmitted to said fault signalling device when $\Delta s_{eff} > \Delta s_{perm}$.

4. An exposure control device according to claim 1 wherein said exposure control means comprises holding link means for storing signals from said exposure meter and for emitting signals corresponding to a previous diaphragm aperture and shutter time combination to said diaphragm and shutter control means upon sensing mean brightness values which would falsify exposure data.

5. An exposure control device according to claim 3 wherein said exposure control means comprises correction circuit means for correcting momentarily measured exposure data by manually inputting values and for emitting signals corresponding to corrected diaphragm aperture and shutter time values to said diaphragm and shutter control means.

6. An exposure control device according to claim 3 wherein said exposure control means comprises holding link means for storing signals, and correction circuit means for checking and weighting signals corresponding to momentary diaphragm aperture and shutter time values with stored signals and then for combining the signals corresponding to momentary diaphragm aperture and shutter time values for transmission to said diaphragm and shutter control means.

7. An exposure control device according to claim 6 wherein said exposure control means comprises automatic monitoring circuit means for emitting an activating signal to said fault signalling device upon sensing a fault.

8. An exposure control device according to claim 5 wherein said exposure control means comprise automatic monitoring circuit means for emitting an activating signal to said fault signalling device upon sensing a fault.

9. An exposure control device according to claim 4 wherein said exposure control means comprise automatic monitoring circuit means for emitting an activating signal to said fault signalling device upon sensing a fault.

10. An exposure control device according to claim 3 wherein said exposure control means comprise automatic monitoring circuit means for emitting an activating signal to said fault signalling device upon sensing a fault.

11. An exposure control device according to claim 2 wherein said exposure control means comprise automatic monitoring circuit means for emitting an activating signal to said fault signalling device upon sensing a fault.

12. An exposure control device according to claim 1 wherein said exposure control means comprise automatic monitoring circuit means for emitting an activating signal to said fault signalling device upon sensing a fault.

13. A method for controlling a diaphragm aperture and shutter time of an aerial camera, comprising the steps of:

measuring aircraft flying speed and height;
computing maximum permissible exposure time according to the relationship $$T_{perm} = \frac{\Delta s_{perm}}{\frac{v}{h} \cdot f}$$

wherein
$T_{perm}$ = said maximum permissible exposure time,
$\Delta s_{perm}$ = permissible image motion,
v = said flying speed, and
h = said flying height;
determining an exposure interval;
  metering a continuous integral of terrain brightness with an exposure meter;
  adjusting shutter time T within a range ($T_{min}$, $T_{perm}$) representing a normal working range as a function of exposure conditions for a diaphragm value B after evaluating signals for $T_{perm}$, mean brightness, status signals of diaphragm and shutter control means and process signals,
  adjusting the diaphragm aperture within the range (B, $B_{max}$), where $B_{max}$ equals a minimum diameter diaphragm aperture according to brightness conditions encountered at limits of the normal working range reached at $T_{min}$, and adjusting the diaphragm within the range (B, $B_{min}$), where $B_{min}$ equals a maximum diameter diaphragm aperture, upon reaching limits defined by $T_{perm}$;
  successively adjusting the aperture value B to discrete values B′<B, and for each of the discrete values B′ adjusting the shutter time as a function of terrain brightness within the range ($T_{min}$, $T_{perm}$); and
  adjusting the shutter time within the range ($T_{perm}$, $T_{max}$) at $B_{min}$.

14. A method according to claim 13 wherein exposure control means adjusts the aperture value B to an optimum diaphragm value $B_{opt}$.

15. A method according to claim 13 wherein a feedback signal for effective shutter time $T_{eff}$ permits the exposure control means to compare a $\Delta s_{eff}$ value corresponding to $T_{eff}$ with $\Delta s_{perm}$ and emits a signal transmitted to a fault signalling device when $\Delta s_{eff} > \Delta s_{perm}$.

16. A method according to claim 13 wherein holding link means stores signals from the exposure meter and emits signals corresponding to a previous diaphragm aperture and shutter time combination to diaphragm and shutter control means upon sensing mean brightness values which would falsify exposure data.

17. A method according to claim 13 wherein momentarily measured exposure data are corrected by manually inputting values and emitting signals corresponding to corrected diaphragm aperture and shutter time values to diaphragm and shutter control means.

18. A method according to claim 13 wherein holding link means for stores signals, and correction circuit means checks and weights signals corresponding to momentary diaphragm aperture and shutter time values with stored signals and then combines the signals corresponding to momentary diaphragm aperture and shutter time values for transmission to diaphragm and shutter control means.

19. A method according to claim 13 wherein an activating signal is automatically emitted to a fault signalling device upon sensing a fault.

* * * * *